June 7, 1955 L. F. WAHL 2,709,820
BEEHIVE COVER
Filed July 26, 1950 2 Sheets-Sheet 2

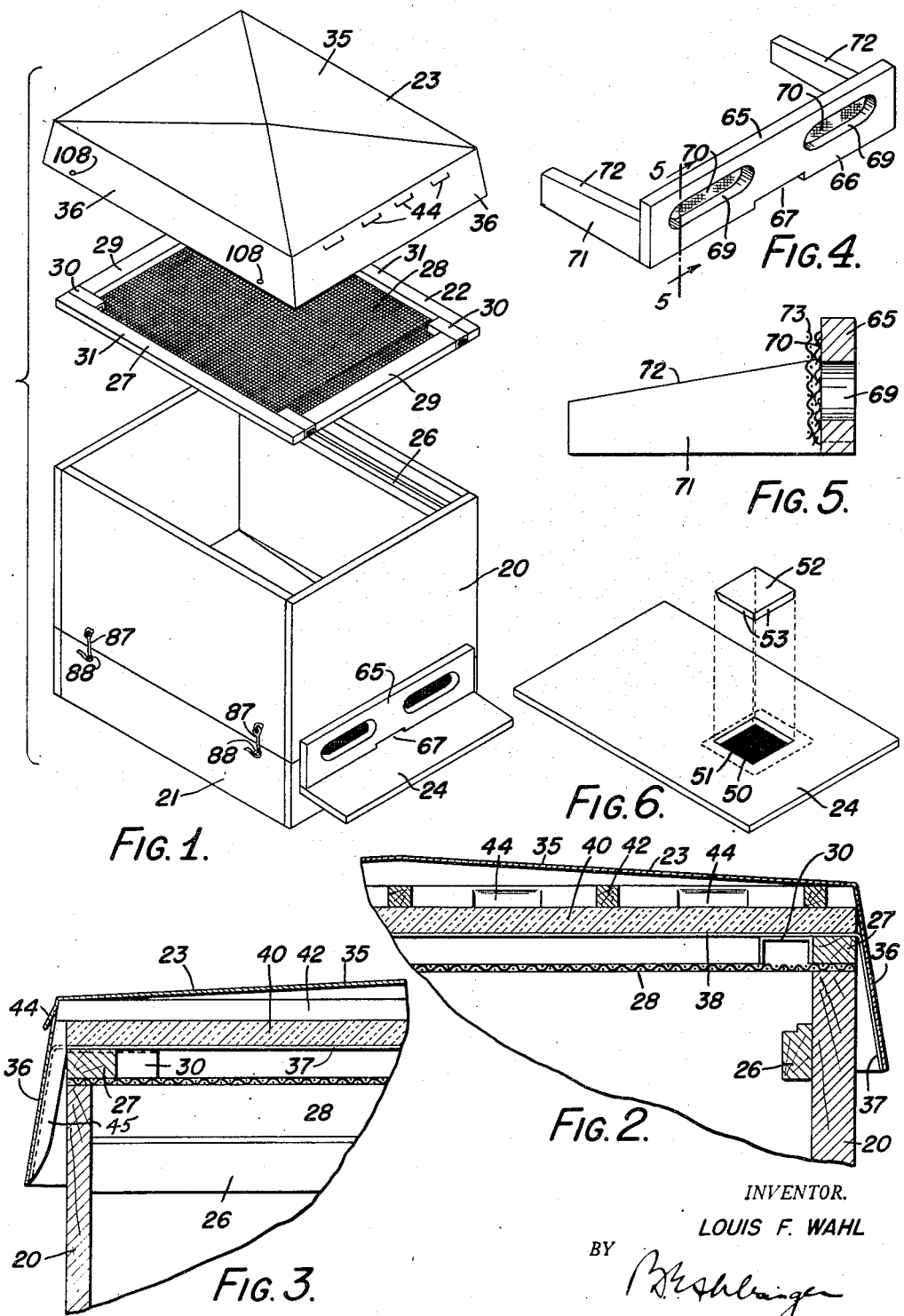

INVENTOR.
LOUIS F. WAHL
BY
ATTORNEY

United States Patent Office 2,709,820
Patented June 7, 1955

2,709,820
BEEHIVE COVER
Louis Franklin Wahl, Rochester, N. Y.

Application July 26, 1950, Serial No. 175,936

4 Claims. (Cl. 6—1)

The present invention relates to beehives.

There are many problems connected with the keeping of bees for the commercial production of honey. In order to obtain maximum output of honey at the proper season and to insure maximum propagation of the bees, the hive should be insulated against high external temperatures during the day, and to prevent the hive from cooling off too much at night. When the hive is not protected in some way against relatively wide changes of temperature, the bees waste a large amount of their energy in protecting themselves from colder temperatures at night, and they are sluggish by day.

The hive should also be well-ventilated internally as an aid in keeping it cool in summer, and to prevent undesirable condensation and the collection of moisture within the hive during the winter months.

Another problem confronting the beekeeper is the frequent necessity during the flowering season of transporting hives from one location to another in order to take advantage of the different flowering crops. Difficulties are experienced in confining the bees during such movement and in ventilating the hive during such movement so that the bees receive plenty of fresh air.

Still other problems are those of preventing the bees from building combs in the hive under the brood chambers, of preventing the bees from escaping while smoking the hive, of protecting the bees against raiders from other hives and from other natural enemies, and of providing winter protection for the hive especially in northern climates.

Beehive covers have been made which provide insulation for the hive but while the conventional beehive cover provides a waterproof covering which fits closely over the hive body, it fails to allow for proper circulation of the air within the hive. The conventional hive is so built, moreover, that the cover must be lifted to permit smoking the hive. This gives the bees a chance to attack the keeper and to escape.

One object of the present invention is to provide an improved construction for beehive covers which will insulate the hive against extremes in temperature.

Another object of the invention is to provide a beehive having a cover through which air can circulate in summer, to draw off heat from the hive and keep it cool.

Another object of the invention is to provide a beehive constructed so that air can circulate freely through it both in summer and winter, thereby to provide ventilation for cooling in summer and prevent condensation in the beehive in winter which tends to result in the formation of mold.

A further object of the invention is to provide a beehive construction which will facilitate the transportation of a hive from one location to another while providing proper ventilation in the hive during the transportation.

A further object of the invention is to provide a hive which will permit of easy winter feeding.

Still another object of the invention is to provide a hive construction which will protect the bees against their natural enemies.

A further object of the invention is to provide a hive having adjustable means for preventing the bees from building combs under the brood chambers.

A still further object of the invention is to provide a beehive construction which will lend itself readily to winter protection.

Still other objects of the invention are to provide a ventilated hive assembly which is simple and inexpensive in construction, which will increase the well being, and as an indirect result, the productivity of the bees, and which is otherwise well adapted for the purpose intended.

Other objects of the invention will be apparent hereinafter from the specification and from the recital of the appended claims.

In the drawings:

Fig. 1 is a perspective exploded view of a beehive built according to one embodiment of this invention, and showing the inner cover and outer cover lifted off the hive;

Fig. 2 is an enlarged fragmentary transverse section of a hive showing the covers in place and illustrating their construction;

Fig. 3 is an enlarged fragmentary longitudinal section of the hive showing the covers in place and further illustrating their construction;

Fig. 4 is a perspective view of the removable guard port which may be employed to reduce the entrance opening to the hive and to protect the hive against natural enemies;

Fig. 5 is an enlarged section through this guard taken on the line 5—5 of Fig. 4;

Fig. 6 is an exploded view of the bottom board of the hive, with its removable block shown lifted off to allow ventilation through the bottom board;

Figure 7:
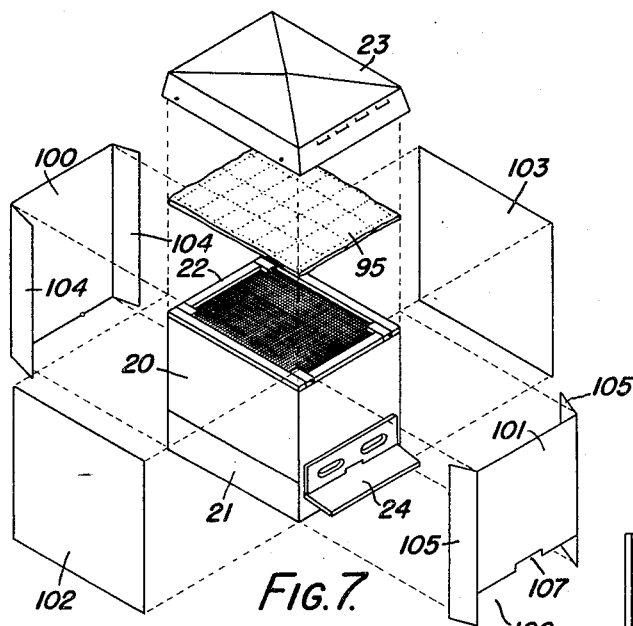
Fig. 7 is an exploded view on a very much smaller scale showing the inner cover in position and the outer cover lifted, and showing the means which may be provided for winter protection.
Figure 8:
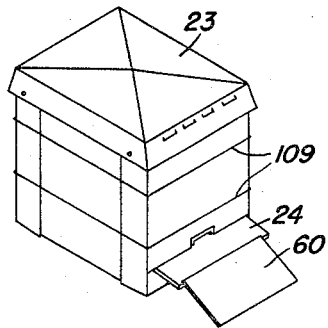
Fig. 8 is a perspective view showing the outer cover and winter protection in place on the hive.

Referring now to the drawings by numerals of reference, 20 (Fig. 1) denotes the brood chamber of the hive, 21 denotes the hive stand, 22 is the inner cover, and 23 is the outer cover.

The brood chamber 20 may be of conventional construction, and the frames 25 (Figs. 9, 10 and 11), which may be of conventional construction, may be suspended within this chamber in conventional manner from cleats 26 (Figs. 1 and 2). The brood chamber 20 may support one or more supers (not shown) of conventional construction in conventional manner.

The top of the brood chamber, or the topmost super, is covered by the inner cover 22 (Figs. 1 to 3). This cover comprises a rectangular wooden frame 27 to the bottom of which is secured in any suitable manner a screen 28. The frame consists of the front and rear straps or boards 29 and the longitudinal side slats or boards 31. The front and rear straps or boards 29 of the frame have inverted U-shaped metallic channel members 30 inserted therein adjacent and parallel to the longitudinal side slats 31. These act as air ducts for ventilation of the brood chamber when the outer cover is in place. The inner cover 22 is adapted to rest on top of the brood chamber 20 or on top of the topmost super which may be positioned on top of the brood chamber.

The outer cover 23 comprises a sheet aluminum, or other metallic roof piece, 35 which has outwardly flared downturned side walls 36. Riveted, welded, or otherwise secured to and within the side walls 36 are generally U-shaped straps 37 and 38 (Figs. 2 and 3), which extend, respectively, transversely and longitudinally of the cover. These straps support a sheet of asbestos board or other suitable insulating material 40 which is held separated from the under surface of the roof 35 by wooden ribs or stringers 42. These ribs or stringers 42 are fastened at opposite ends to the longitudinally extending downturned side walls 36 of the roof. The stringers 42 serve to space the insulating sheet 40 from the roof 35 so that an air space is provided between the insulating sheet 40 and the roof. Louvers 44 (Figs. 1 and 3) are provided in the roof by slotting the front and rear walls 36 of the roof and bending out the slotted portions. These permit air to circulate under the roof-piece 35 so that the hot air is carried away from under the roof piece, and the cover is kept cool in summer.

The cover 23 is adapted to be placed on top of the inner cover 22 with the straps 37 and 38 and the insulating sheet 40 resting on top of the framework 27 of the inner cover and on top of the metallic ducts 30 in that framework. Cleats 45 (Fig. 3), which are secured within the front and rear downturned sides 36 of the roof, space these sides of the roof from the sides of the brood chamber and allow air to circulate up along the outside of the hive through ducts 30, screen 28 of inner cover 22, and down into the brood chamber, or vice versa.

The downturned sides 36 of the roof sheet 35 taper outwardly as shown clearly in Figs. 2 and 3. In shipment, therefore, covers made according to this invention may be nested together in one another so as to occupy a minimum of shipping space.

The insulation sheet 40, and the air in the space between the insulation sheet and the roof will protect the hive and tend to keep it warm in winter. In summer, insulation sheet 40 will tend to protect the hive from outside heat; and the hot air in the air space will flow out from under the roof through the louvers 44, causing air circulation which will also tend to keep the hive cool. In winter or summer, internal circulation in the hive is provided through the wire screening 28 and ducts 30 of the inner cover, and the air space provided by cleats 45 at front and rear of the outer cover between the front and rear sides 36 of the outer cover and the corresponding sides of the main body of the hive.

The bottom board 24 is in the form of a rectangular panel made of wood, metal, plastic, or any other suitable material. It has a rectangular or square hole 50 (Fig. 6) cut therein in which is secured a piece of wire netting 51. The side walls of the opening 50 are preferably beveled; and a block 52 having beveled side walls 53 is provided for insertion into the opening 50 to close the opening.

The hive stand 21 has two parallel ledges 55 and 56 (Figs. 9, 10 and 11) secured inside its rear wall. It has an enlarged opening 57 (Fig. 11) in its front wall providing an entrance to the hive.

Figure 9:
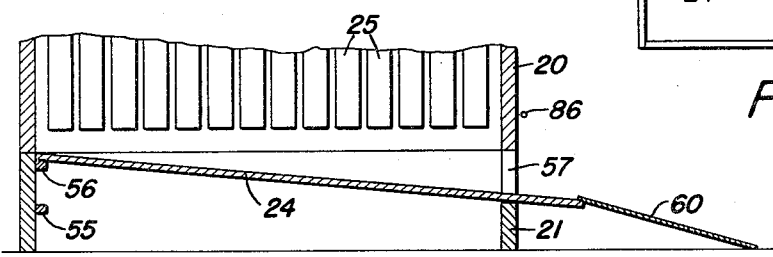
Fig. 9 is a fragmentary longitudinal section through the bottom part of the hive showing the bottom board in normal summertime position.

In normal summertime use, the bottom board 24 is positioned as shown in Fig. 9 with its rear end resting on the upper ledge 56 of the rear wall of the hive stand and with its front end resting on the bottom wall 58 (Fig. 11) which bounds the entrance 57 of the hive. A flight platform 60 may rest on the front end of the bottom board 24 in this position to provide a base for take-off of the bees.

The entrance 57 is preferably made larger than usual to provide maximum flow of air through the hive for summertime ventilation. Wires 85 (Fig. 11) are fastened to the opposite sides of the bottom board near the front thereof and the wires may be threaded into the screw-eyes 86 which are secured in the front wall of the brood chamber. With these wires bottom board 24 may be raised and fastened, to provide an entrance opening of conventional size for a sturdy hive, or to provide an entrance opening of still further reduced size such as desirable if the hive is weak.

Figure 12:
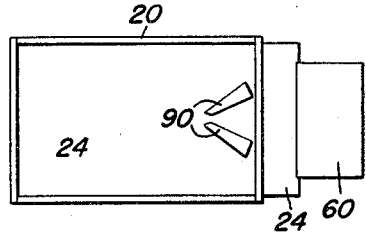
Fig. 12 is a plan view of the hive on a small scale and with the covers removed, showing the auxiliary boards placed to narrow the entrance to the hive.
Figure 13:
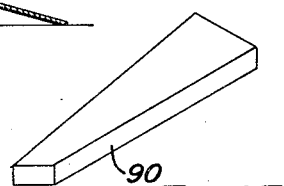
Fig. 13 is a perspective view of the one of these auxiliary boards.

To prevent the bees from building stray honey outside of the combs, blocks 90 (Figs. 12 and 13) are provided. These are adapted to be positioned inside the entrance of the hive under the frames 25 and in such way as to narrow the space between the bottoms of the frames 25 and the top of the bottom board 24 so that insufficient room is left for the bees to build up stray honey. If the hive is weak, these blocks 90 may also be used to narrow the entrance to the hive, by placing them on the bottom board 24 outside the entrance to the hive in converging relationship, similar to that shown in Fig. 12, so as to narrow the entrance to the hive.

Figure 10:
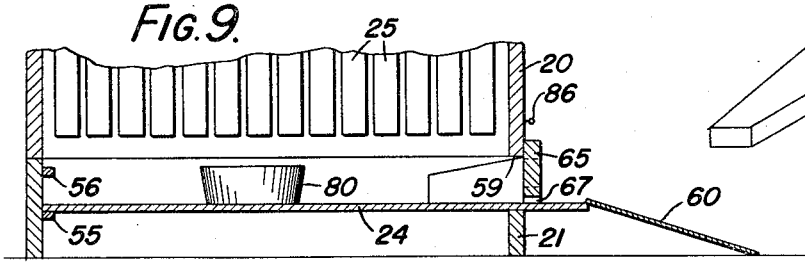
Fig. 10 is a corresponding fragmentary section showing the bottom board lowered for fall feeding.

In the fall, if the beekeeper finds that there is insufficient food stored in the hive for the winter, he can lower the rear end of the bottom board 24 so that it rests at its rear on the lower ledge 55, as shown in Fig. 10, and can place on the top of the bottom board a receptacle 80 containing syrup or other food for the bees.

To protect the bees from their natural enemies in the wintertime, a port closure 65 of the construction shown particularly in Figs. 4 and 5 may be provided. This comprises a front board 66 having a narrow entrance port 67 provided centrally at the bottom thereof, and having ventilating openings 69 therein. These openings, which together may have the total area of a conventional summertime hive entrance, are covered by screening 70 backed up by burlap or other material 73. The screening protects against natural enemies. The burlap permits ventilation without draft. Parallel legs 71 project from the rear of the front piece 66. These have beveled surfaces 72 so that they may readily be inserted into the entrance opening 57 of the stand 21 (Fig. 10).

Figure 11:
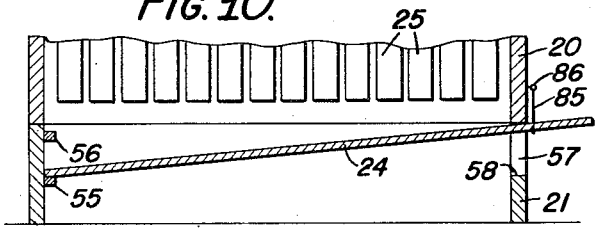
Fig. 11 is a corresponding fragmentary section showing the bottom board in raised position, sealing the hive against escape of the bees during transportation of the hive.

One of the features of the present invention is the ease with which the hive can be converted for transport. The rear end of the bottom board 24 is placed on the lower ledge 55 of the stand, and the front end of the bottom board is raised until it abuts against the upper face 59 (Fig. 10) of the entrance 57, as shown in Fig. 11. The lowered rear end provides space in which the bees may cluster under the frame during transport. The raised front end prevents escape of the bees from the hive during transport. The bottom board can be secured in this transport position by the wires 85. The hive stand 21 itself can be secured to the brood chamber 20 by hooks 87 (Fig. 1) which are pivoted on the sides of the brood chamber and which engage studs 88 fastened in the side of the stand 21.

For transportation, also, the block 52 (Fig. 6) is removed from the bottom board 24 so that the hive can be ventilated through the screened opening 50 of the bottom board, and the screening 28 and ducts 30 of the inner cover 22.

Another feature of the invention is the inner cover 22. It not only aids in ventilation of the hive, but provides a protective cover through which the hive can be smoked without lifting the inner cover. In conventional hives, it is necessary to lift the inner cover from the hive in order to smoke the hive; and in this process the bees may escape. With the hive of the present construction, the hive can readily be smoked without lifting the inner cover. Hence when the bees are stupefied the queen can readily be separated from the other bees without any danger of any escaping.

For winter protection, one or more sheets of quilting or other insulating material 95 (Fig. 7) are placed on top of the inner cover 22 between the inner cover and the insulating sheet 40 of the outer cover. At the same time there can be placed around the brood chamber and hive stand an outer covering comprising sheets of tar paper or other insulating weather-protective material. Thus a back protective sheet 100 (Fig. 7), a front protective sheet 101, and side protective sheets 102 and 103 may be provided. The front and rear protective sheets may have side flaps 104 and 105, respectively, to lap over the side sheets 102 and 103. The front protective sheet is provided with a slot 106 and a smaller slot 107 to align with the entrance ports 57 and 67 of the hive. The outer cover 23 may be provided with pins along the sides to which the panels 100, 101, 102 and 103 may be secured by wires.

The slot 107 allows the bees to move in and out of the hive on warm days in winter; and the slot 107, screen 28, and ducts 30 permit sufficient circulation of air, even when the hive has its full winter protection, to prevent moisture from condensing in the hive and deleteriously affecting the colony.

As will be seen, then, I have provided a hive with an insulating, ventilated outer cover, with an inner cover which is perforated for ventilation and through which the bees can be smoked without the necessity of lifting the inner cover off the brood chamber or supers, with a tiltable bottom board, which can be adjusted to close the bottom of the hive and prevent escape of the bees during transportation and which at the same time is constructed to permit ventilation during transportation of the hive, with an auxiliary entrance port with burlap-covered ventilating openings to prevent draft, and with blocks to prevent the bees from laying stray honey outside of the combs. Furthermore, I have provided a hive stand having a large entrance opening which through adjustment of the bottom board permits putting in trays of syrup and the like for winter feeding. I have provided a hive construction, therefore, far superior to conventional designs.

While the invention has been described in connection with a specific embodiment thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. A cover for a beehive comprising a waterproof roof portion having a generally rectangularly shaped top panel and four depending outwardly flared sides, a plurality of spaced parallel rib members secured to said roof portion within the sides thereof, and a rectangular sheet of insulating material secured beneath said rib members within the sides of said roof portion and spaced by said rib members from the top panel of said roof portion, the sides at two opposite ends of the roof portion being provided with ventilating openings registering with the spaces between said rib members to permit circulation of air between said top panel and said insulating sheet, and said sheet abutting at two opposite ends against the sides at the two other opposite ends of the roof portion.

2. A removable outer cover for a beehive comprising a metallic roof portion having a top panel and four depending, outwardly-flared sides, a plurality of spaced parallel rib members secured at opposite ends to two parallel depending sides of said roof portion, a generally rectangular sheet of insulating material secured to said rib members within the sides of said roof portion and spaced by said rib members from the top panel of said roof portion, said two parallel sides being provided with ventilating openings registering with the spaces between said rib members to permit circulation of air between said top panel and said insulating sheet, and a plurality of spaced cleats secured to said two parallel depending sides of said roof portion to space these sides of the roof from the side walls of the hive on which the roof is used, said sheet abutting at two opposite ends against said cleats and at its other two opposite ends against the other two sides of said roof portion.

3. A removable outer cover for a beehive comprising a metallic roof portion having a top panel and four depending, outwardly-flared sides, a plurality of spaced parallel rib members secured at opposite ends to two parallel depending sides of said roof portion, a plurality of inverted U-shaped straps having their leg portions secured to opposite depending sides of said roof portion, a generally rectangular sheet of insulating material supported upon said straps between said straps and said rib members to be spaced by said rib members from the top panel of said roof portion, said two parallel sides of said roof portion having ventilating openings therein registering with the spaces between said rib members to permit circulation of air between said top panel and said insulating sheet, and a plurality of spaced cleats secured to said two parallel depending sides of said roof portion to space these sides of the roof from the side walls of the hive on which the roof is used, said sheet abutting at two opposite ends against said cleats and at its other two opposite ends against the other two sides of said roof portion.

4. A removable outer cover for a beehive comprising a generally rectangular shaped waterproof top panel, side walls depending from said top panel around the perimeter of said top panel and outwardly flared, a rectangular sheet of insulating material, and means for mounting said insulating sheet in said cover in spaced relation to and below said top panel with two opposed ends of said sheet abutting against two corresponding walls of said side walls, the other two side walls being provided with ventilating openings which establish communication between the atmosphere and the space between said top panel and said sheet.

References Cited in the file of this patent

UNITED STATES PATENTS

| Number | Name | Date |
|---|---|---|
| 620,859 | Taylor | Mar. 7, 1899 |
| 791,754 | Danzenbaker | June 6, 1905 |
| 874,863 | Pratt | Dec. 24, 1907 |
| 1,064,779 | Schamu | June 17, 1913 |
| 1,122,697 | Danzenbaker | Dec. 29, 1914 |
| 1,468,995 | Cottam | Sept. 25, 1923 |
| 1,523,318 | Utton | Jan. 13, 1925 |
| 1,893,431 | Meier | Jan. 3, 1933 |
| 2,025,908 | Schlegel | Dec. 31, 1935 |
| 2,075,318 | Whitehouse | Mar. 30, 1937 |
| 2,227,525 | Williams | Jan. 7, 1941 |
| 2,446,081 | Diehnelt | July 27, 1948 |
| 2,498,880 | Diehnelt | Feb. 28, 1950 |
| 2,530,801 | Babcock, Jr. | Nov. 21, 1950 |
| 2,543,750 | Albrecht | Mar. 6, 1951 |

FOREIGN PATENTS

| Number | Country | Date |
|---|---|---|
| 610,771 | France | June 19, 1926 |